(12) United States Patent
Ning

(10) Patent No.: US 7,864,452 B2
(45) Date of Patent: Jan. 4, 2011

(54) WIDE ANGLE LENS

(76) Inventor: Alex Ning, 2122 Sea Island Pl., San Marcos, CA (US) 92069

( * ) Notice: Subject to any disclaimer, the term of this patent is extended or adjusted under 35 U.S.C. 154(b) by 0 days.

(21) Appl. No.: 12/597,781

(22) PCT Filed: Mar. 5, 2008

(86) PCT No.: PCT/US2008/055903

§ 371 (c)(1),
(2), (4) Date: Oct. 27, 2009

(87) PCT Pub. No.: WO2008/137202

PCT Pub. Date: Nov. 13, 2008

(65) Prior Publication Data

US 2010/0118418 A1 May 13, 2010

Related U.S. Application Data

(60) Provisional application No. 60/928,132, filed on May 7, 2007, provisional application No. 60/933,952, filed on Jun. 8, 2007, provisional application No. 60/999,071, filed on Oct. 15, 2007.

(51) Int. Cl.
*G02B 13/04* (2006.01)
*G02B 6/62* (2006.01)
(52) U.S. Cl. .......................... 359/752; 359/762
(58) Field of Classification Search .............. 359/752, 359/762
See application file for complete search history.

(56) References Cited

U.S. PATENT DOCUMENTS

| 3,737,214 | A | 6/1973 | Shimizu |
| 3,741,630 | A | 6/1973 | Nakagawa |
| 6,038,085 | A | 3/2000 | Nakazawa |
| 6,590,719 | B2 * | 7/2003 | Bos ........................... 359/753 |
| 6,844,991 | B2 | 1/2005 | Mizuguchi |
| 7,123,426 | B2 | 10/2006 | Lu |
| 7,161,746 | B2 | 1/2007 | Mizuguchi |
| 7,173,776 | B2 | 2/2007 | Tada |
| 2005/0219715 | A1 | 10/2005 | Kimura |

* cited by examiner

Primary Examiner—William C Choi
(74) Attorney, Agent, or Firm—Mark Wisnosky

(57) ABSTRACT

A wide angle lens especially suitable for digital single lens reflex cameras is described. The lens offers the advantages of superior performance while using fewer lens elements thus reducing size and cost to manufacture. The lens consists of two lens groups separated by an aperture stop. The first lens group consists of a meniscus lens and the novel use of a bi-concave lens element. The first group may also include a cemented doublet with novel ratios of refractive index and Abbe numbers. Embodiments of the wide angle lens satisfy conditional equations of $6 \leq BFL/f \leq 7.5$ and $10 < \Sigma d/f \leq 21$, where BFL is the distance from the most image side lens element surface to the image plane with the lens focused at infinity, f is the effective focal length of the wide angle lens and $\Sigma d$ is the distance from the most object side lens element surface to the most image side lens element surface.

21 Claims, 6 Drawing Sheets

WIDE ANGLE LENS

CROSS-REFERENCE TO RELATED APPLICATIONS

This application claims the benefit of U.S. Provisional Patent Applications 60/928,132, filed May 7, 2007, and 60/933,952, filed Jun. 8, 2007, and 60/999,071, filed Oct. 15, 2007, all entitled "Fisheye Lens", all currently pending, all by the same inventor and all incorporated by reference.

BACKGROUND OF THE INVENTION

1. Technical Field

The present invention relates to a wide angle lens system for photographic applications and in particular for digital single lens reflex cameras.

2. Related Background Art

Wide angle lenses capable of capturing 175° or more angle of view are useful for creating panoramic images. Digital Single Lens Reflex (DSLR) cameras are gaining popularity both for the amateur and professional photographer as the electronics have provided improved image quality. Cameras using 10 megapixel sensors and improved electronics have resulted in image quality that can rival and even exceed that of conventional 35 mm film cameras. The physical dimensions of the DSLR camera sensors are however not always identical to the dimensions used for film based cameras. Digital cameras require new designs for lenses. The lenses must accommodate image size requirements for the digital sensors, and back focal length constraints based upon the dimensions of the cameras and its internal mechanics and still provide exceptional image quality and optical performance as defined in terms of low aberrations. These combined requirements have provided new challenges in wide angle lens design. Additionally the advances in electronics have resulted in a reduction in costs for advanced photographic systems. The reduced costs for cameras have placed increased pressure on lens designers and manufacturers to also reduce cost. A primary means to reduce cost is to design lenses that provide the same performance with fewer lens elements.

Some DSLR cameras use CMOS or CCD imagers that are smaller in effective area than a 35 mm-film frame which has an active area of approximately 36 mm×24 mm. For example, the Canon® 350D camera uses a CMOS imager with approximately 23×15 mm image area (known as "APS-C" format). The Nikon® D40x uses a CCD imager with a similar effective area (known as "DX" format). In order to form a complete circular image with such DSLR cameras, the lens image circle must be less than the vertical height of the sensor. This, in turns, requires that the focal length or effective focal length (EFL or f) of the wide angle lens is about 6 mm or shorter.

The structure of the camera dictates that the back focal distance (BFL) of the wide angle lens must be sufficiently long in order to avoid colliding with the mirror inside the camera body. The short EFL and long BFL requirement makes the wide angle lens design difficult.

Existing lens designs such as those disclosed in U.S. Pat. Nos. 6,844,991 and 3,737,214 and 3,741,630 and Japanese Patent JP60-153018 do not fulfill this requirement of long BFL and short EFL for DSLR cameras having APS-C or DX format sensors. The inventor is aware of only one other commercially available wide angle lens made by Coastal Optical Systems (http://www.coastalopt.com/stan_01c.asp) that fulfills the dimensional requirements for the DX format cameras. However, the Coastal lens design is large and complex (it has 10 internal lens elements) and thus expensive to produce.

There is a therefore a need for a wide angle lens that has a field of view of at least 175° with excellent imaging characteristics and low cost to manufacture. There is a need to provide a wide angle lens design with at least a 175° field of view that provides a full circular image on an APS-C or DX format imagers. There is a need for lenses that simultaneously provide at least a 175° field of view, a full circular image on an APS-C or DX format imagers, have excellent image characteristics and a low cost to manufacture.

DISCLOSURE OF THE INVENTION

The lens structure of the present invention is made of two lens groups; a front group nearer the object and a rear group nearer the image with an aperture stop in between. In one embodiment, the front group is comprised of four elements. The term "lens" is used to refer to the invented wide-angle lens or wide-angle lens system. The lens consists of individual lens elements or just elements. Multiple lens elements are referred to as a group or a lens group. The front or first group refers to that group of lens elements nearer the object and the rear or second group refers to that group of lens elements nearer the image. When lens elements numbers are discussed, these elements are numbered sequentially from object to image. Lens element one would be that element nearest the object. Counting from the object side, the first element is a meniscus element with negative power having a convex object surface. The object surface is defined as the element surface facing the object plane. The image surface is defined as the element surface facing the image plane. The second element is a biconcave element. In other prior art lenses the second element is a meniscus element with negative power. The third and fourth elements are a cemented doublet wherein the third element has positive power and the fourth element has negative power. The fourth element is closer to the image plane than the third element. Unlike a conventional cemented doublet, both the refractive index and the Abbe number of the negative element of the doublet are greater than that of the positive element of the doublet.

The rear lens group comprises at least one cemented doublet, the fifth element and the sixth element. The fifth element has positive power and the sixth element has negative power. In one preferred embodiment, the rear group further comprises another lens element (the seventh element) with positive power. The combination of lens elements put together in a structure that satisfies the parametric equations discussed below enables a new wide angle lens that is suitable for digital applications while meeting demanding performance and cost goals.

MODES FOR CARRYING OUT THE INVENTION

There are two preferred embodiments of the present invention. In both embodiments the lens structure is made of two groups of lens elements. The first or the front group is a negatively powered group with four lens elements. The second or the rear group is positively powered. In the first embodiment, the second group is made of a two elements glued together to form a cemented doublet. In the second embodiment, the second group is made of three elements, a cemented doublet and a positive power element.

Figure 1:
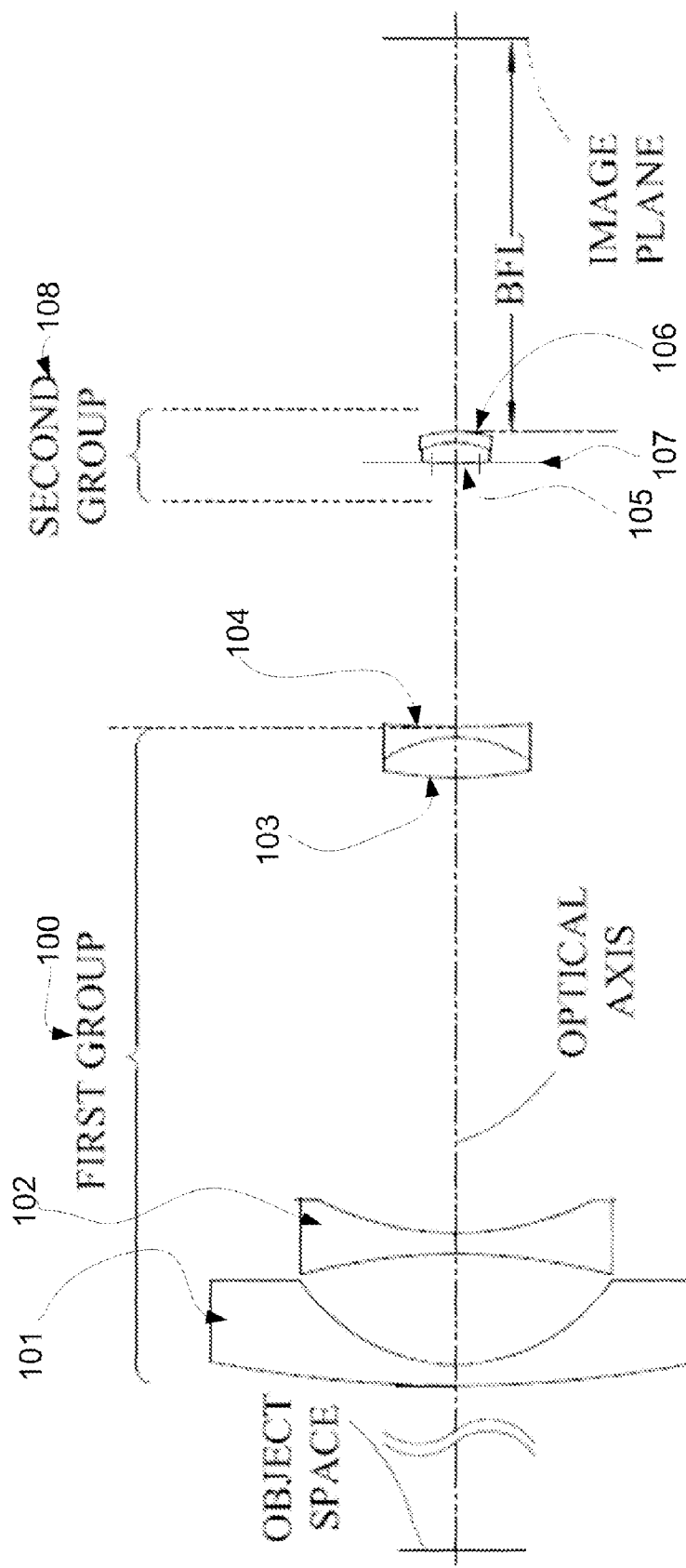
FIG. 1 is a schematic side sectional view of a first embodiment of the invention Wide angle lens.

Referring to FIG. 1, the lens structure of the first embodiment of the present invention is made of two lens groups; a front group 100 and a rear group 108 with an aperture stop 107 in between. The front group 100 is comprised of four elements 101, 102, 103, 104. Counting from the object side, the first element 101 is a meniscus element with negative power having a convex object surface. The object surface is defined as the element surface facing the object plane. The image surface is defined as the element surface facing the image plane. The first element 101 image surface is concave having a radius of R1$i$ and it satisfies the condition:

$$2.5<|R1i/f|<3.5, \qquad \text{eq.(1)}$$

where f is the effective focal length of the entire lens.

The second element 102 is a biconcave element. Most prior art wide angle lenses have its second element being a meniscus. A biconcave element is easier and less costly to manufacture. The third 103 and fourth 104 element forms a cemented doublet wherein the third element has positive power and the fourth element has negative power. The fourth element is closer to the image plane than the third element. Unlike conventional cemented doublet, both the refractive index and the Abbe number of the negative element 104 of the doublet is greater than that of the positive element 103 of the doublet expressed as follows:

$$N4>N3; \qquad \text{eq.(2)}$$

$$V4>V3; \qquad \text{eq.(3)}$$

where N4 is the index of refraction of the fourth element at 578 nm (d-line) and V4 is the Abbe number; N3 is the index of refraction of the third element at 578 nm (d-line) and V3 is the Abbe number.

The rear lens group comprises at least one cemented doublet 105, 106 the fifth element and the sixth elements. The sixth element 106 has negative power.

In this preferred embodiment, the following conditions are satisfied:

$$2<|f1/f|<3 \qquad \text{eq.(5)}$$

$$1.5<|f12/f|<2.5 \qquad \text{eq.(6)}$$

$$4<|f2/f|<5 \qquad \text{eq.(7)}$$

Where f1 is the effective focal length of the front group and f2 is the effective focal length of the rear group, and f12 is the effective focal length of the first and second elements 101, 102 as a group.

Figure 3:
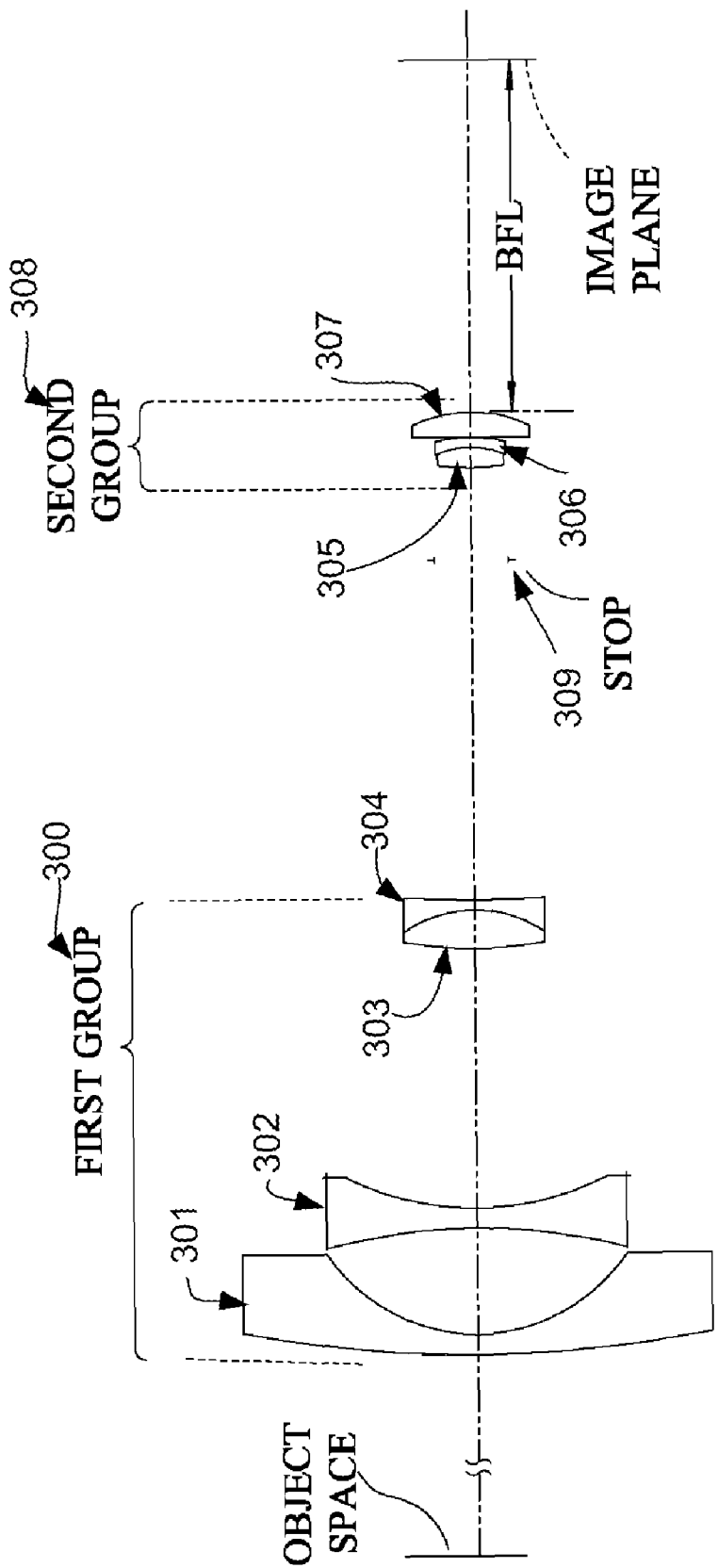
FIG. 3 is a schematic side sectional view of a second embodiment of the invention Wide angle lens.
Figure 4A:
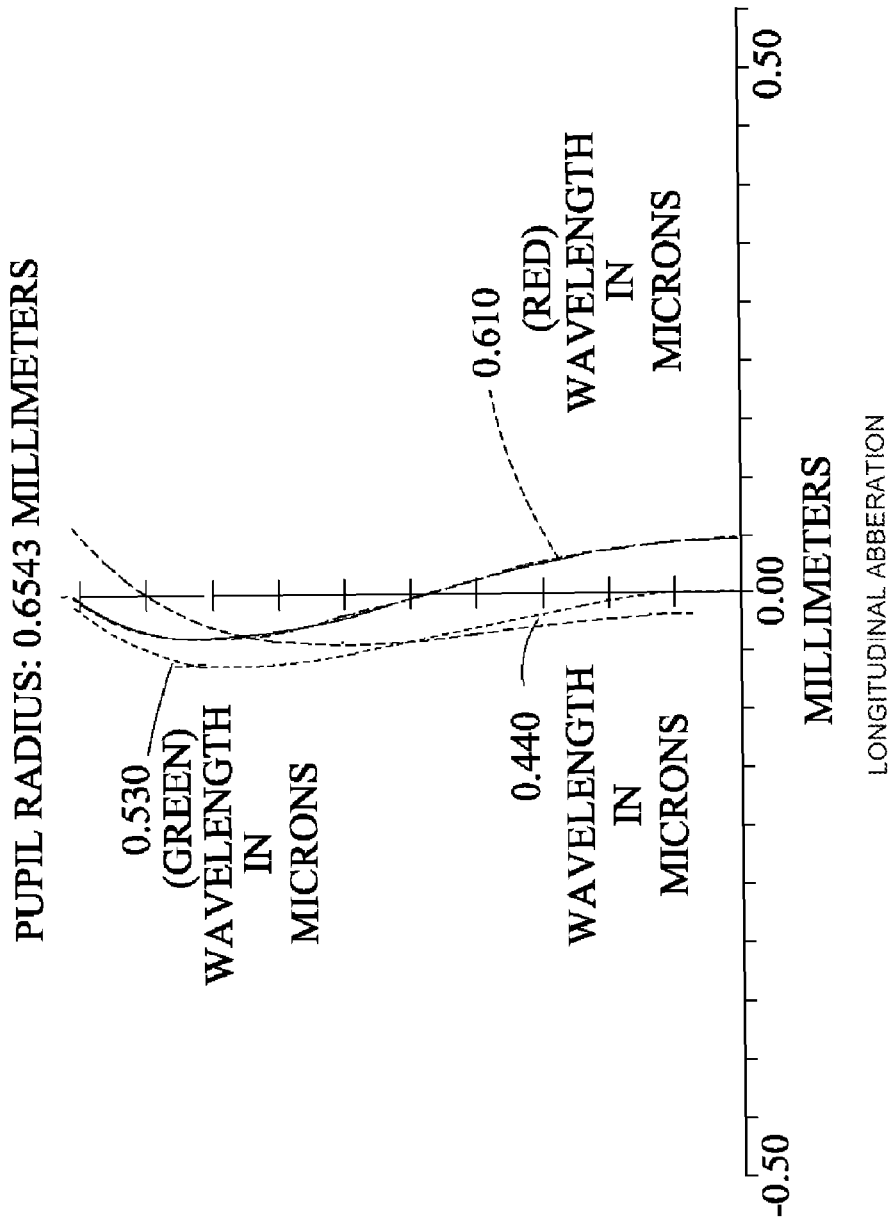
FIG. 4a is a graph of the longitudinal aberration obtained by the second embodiment of the invention Wide angle lens.
Figures 4B, 4C:
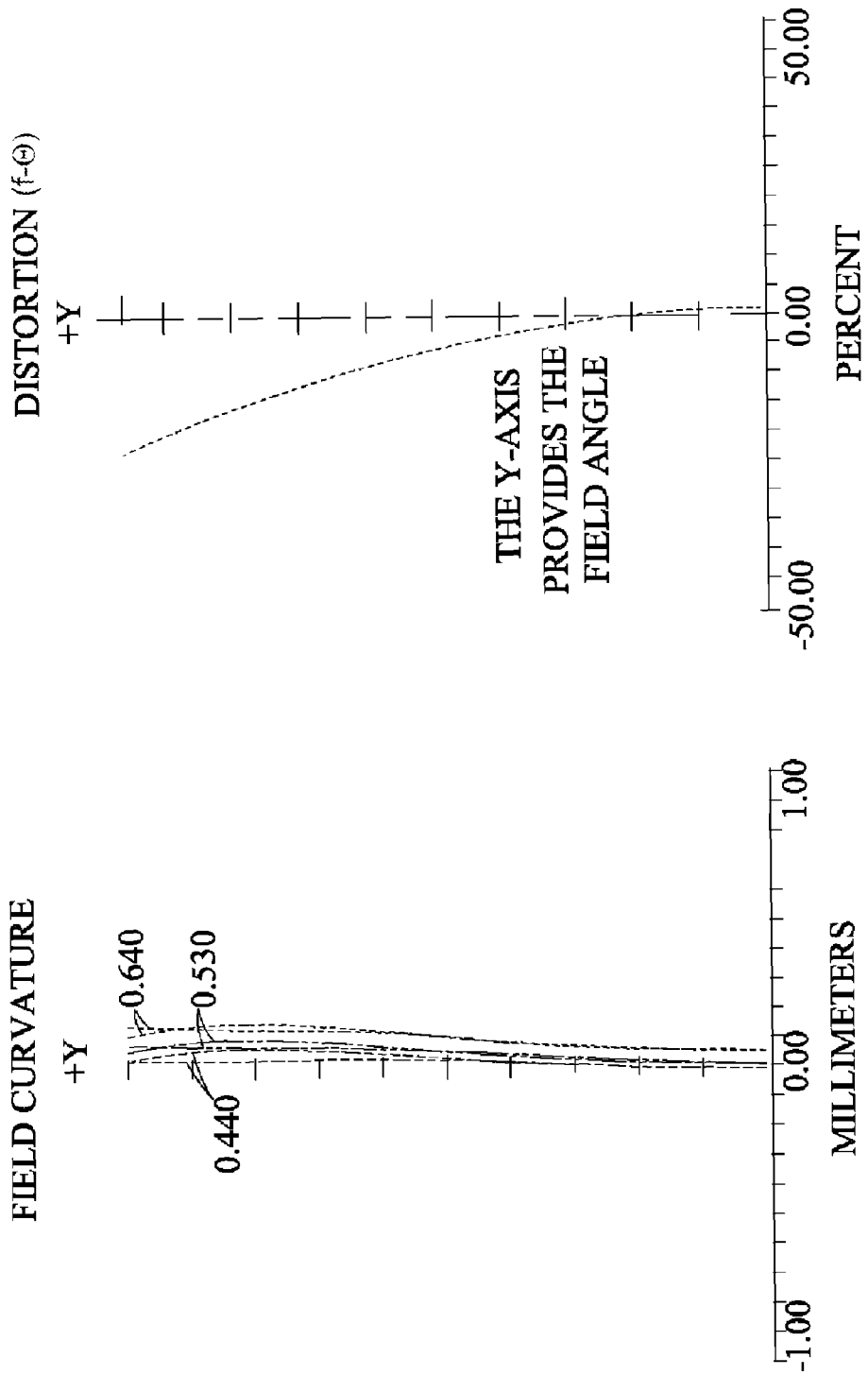
FIG. 4b is a graph of the field curvature obtained by the second embodiment of the invention Wide angle lens.
FIG. 4c is a graph of distortion obtained by the second embodiment of the invention Wide angle lens.

In a second preferred embodiment depicted in FIG. 3 the rear group 308 further comprises another lens element 307 (the seventh element) with positive power.

The lens element 307 in the rear group satisfies:

$$|R7o|>|R7i| \qquad \text{eq.(4)}$$

where R7$o$ is the radius of the object surface and R7$i$ is the radius of the image surface. Referring to FIG. 3, the lens structure of this second embodiment of the present invention is made of two lens groups; a front group 300 and a rear group 308 with an aperture stop 309 in between. The front group 300 is comprised of four elements 301, 302, 303, 304. Counting from the object side, the first element 301 is a meniscus element with negative power having a convex object surface. The first element 301 image surface is concave having a radius of R1$i$ and it satisfies the condition:

$$2.5<|R1i/f|<3.5, \qquad \text{eq.(1)}$$

where f is the effective focal length of the entire lens assembly.

The second element 302 is a biconcave element. The third 303 and fourth 304 elements form a cemented doublet wherein the third element has positive power and the fourth element has negative power. The fourth element is closer to the image plane than the third element. Unlike conventional cemented doublet, both the refractive index and the Abbe number of the negative element 304 of the doublet is greater than that of the positive element 303 of the doublet expressed as follows:

$$N4>N3; \qquad \text{eq.(2)}$$

$$V4>V3; \qquad \text{eq.(3)}$$

where N4 is the index of refraction of the fourth element at 578 nm (d-line) and V4 is the Abbe number; N3 is the index of refraction of the third element at 578 nm (d-line) and V3 is the Abbe number. The rear lens group comprises a cemented doublet 305, 306 the fifth element and the sixth elements and a singlet positive power lens 307 positioned on the image side of the sixth element. The sixth element 306 has negative power. The seventh element 307 is a singlet that satisfies the condition:

$$|R7o|>|R7i| \qquad \text{eq.(4)}$$

In preferred embodiments, the following conditions are satisfied:

$$2<|f1/f|<3 \qquad \text{eq.(5)}$$

$$1.5<|f12/f|<2.5 \qquad \text{eq.(6)}$$

$$4<|f2/f|<5 \qquad \text{eq.(7)}$$

Where f1 is the effective focal length of the front group and f2 is the effective focal length of the rear group, and f12 is the effective focal length of the first and second elements 301, 302 as a group.

Both embodiments satisfy the following condition:

$$BFL/f>=6 \qquad \text{eq.(8)}$$

$$BFL/f<=7.5 \qquad \text{eq.(9)}$$

where BFL is the distance from the vertex of the last surface of the last element to the image plane when the lens is focused at infinity. If condition shown by eq. (8) is not satisfied, either the image circle would be too large for the APS-C or DX format cameras or/and the BFL would not be long enough to clear the movement of the mirror inside the camera body. If condition shown by eq. (9) is not satisfied, the lens image quality will be significantly degraded without having a larger number of lens elements.

The preferred the embodiments also satisfy the following condition:

$$10 < \Sigma d/f <= 21 \quad \text{eq.}(10)$$

where $\Sigma d$ denotes the distance from the most object side lens element surface to the most image side lens element surface. If the lower bound is exceeded, the image circle of the lens will be too large for APS-C sensor size and if the upper bound is exceeded, the lens becomes excessively large and expensive to produce.

Other Embodiments

Other variations on the basic embodiment are also possible. Though the first group is made of 4 elements in both preferred embodiments, in other embodiments adding more elements to the first and second groups further improves the lens performance. In yet other embodiments some of the lens element surfaces are made aspherical to gain additional image quality benefits. As shown in the first embodiment discussed in detail in conjunction with FIG. 1, the second group can be as simple as a doublet. In other embodiments more elements are added to the second group thus improving the overall performance of the design especially to gain some additional aperture. Aspherizing a surface in the first or second group will also help to improve lens performance. In order to keep the cost of manufacturing low, it is generally preferable to keep the number of elements as low as possible.

In another embodiment, not shown, the front group further comprises a cemented doublet lens element in place of the 2nd element 102 of FIG. 1 and optimized to further reduce the lateral chromatic aberration.

In yet another embodiment the second group 108 further comprises two or more doublet lenses to increase the relative aperture of the lens. In another embodiment the second lens group consists of a seventh, eight lens elements where the seventh and eighth lens elements for a cemented doublet.

In yet another embodiment the first 101 lens element of the first group is made aspherical to reduce the field-related aberrations in the lens. In another embodiment the second lens element 102 of the first group is made aspherical to reduce field related aberrations in the lens. In another embodiment both the first 101 and the second 102 lens elements of the first group are made aspherical.

In yet another embodiment the one or more lens element surfaces of the second group 108 are aspherical to improve the aperture-related aberrations in the lens.

The preferred embodiments require that the first group to be negative in power having at least 4 elements, the second element is a bi-concave element and the $3^{rd}$ and $4^{th}$ elements form a cemented doublet where both the index of refraction and Abbe number of the $4^{th}$ element is greater than that of the $3^{rd}$ element, and the second group to have positive power having at least 2 elements. The elements should be aligned and spaced so that the ratio of the BFL to the EFL is greater or equal to 6 but less than 7.5.

EXAMPLE 1

Table 1 shows detailed prescription data of a design embodiment of the invention depicted in FIG. 1 and discussed above. The surfaces are counted from the object side to the image side. Therefore in the table the first element 101 of FIG. 1 would have an object side radius of 137 mm, a thickness of 2 mm, an index of refraction of 1.65 and an Abbe Number of 55.9 and an image side radius of 19.7. Remaining dimensions of the elements of this example can thereby be read from Table 1 with reference to FIG. 1.

TABLE 1

Prescription data for a first embodiment
Effective Focal Length: 6.2 mm
Back Focal Length: 37.9 mm
SURFACE DATA SUMMARY:

| Surf | Type | Radius (mm) | Thickness (mm) | Index (Nd) | Abbe# |
|---|---|---|---|---|---|
| OBJ | STANDARD | Infinity | Infinity | | |
| 1 | STANDARD | 137.3 | 2.00 | 1.651 | 55.89 |
| 2 | STANDARD | 19.7 | 10.76 | | |
| 3 | STANDARD | −64.1 | 1.96 | 1.651 | 55.89 |
| 4 | STANDARD | 32.3 | 44.0 | | |
| 5 | STANDARD | 44.5 | 3.86 | 1.722 | 29.25 |
| 6 | STANDARD | −14.0 | 1.00 | 1.836 | 42.29 |
| 7 | STANDARD | 110.1 | 25.5 | | |
| STO | STANDARD | 32.2 | 2.06 | 1.487 | 70.09 |
| 9 | STANDARD | −8.86 | 1.00 | 1.785 | 25.75 |
| 10 | STANDARD | −14.2 | 37.9 | | |
| IMA | STANDARD | Infinity | | | |

This example embodiment has the following properties:

$|R1i/f|=3.18$; within the range of 2.5 to 3.5 of eq.(1);

p N4>N3; eq.(2)

V4>V3; eq.(3)

$|f1/f|=2.45$; within the range of 2 to 3 of eq.(5)

$|f12/f|=2.34$; within the range of 1.5 to 2.5 of eq.(6)

$|f2/f|=4.38$; within the range of 4 to 5 of eq.(7)

$BFL/f=6.11$; within the range of 6 to 7.5 of eq.(8) and eq.(9)

$\Sigma d/f=15$; within the range of 10 to 21 of eq.(10).

Figure 2A:
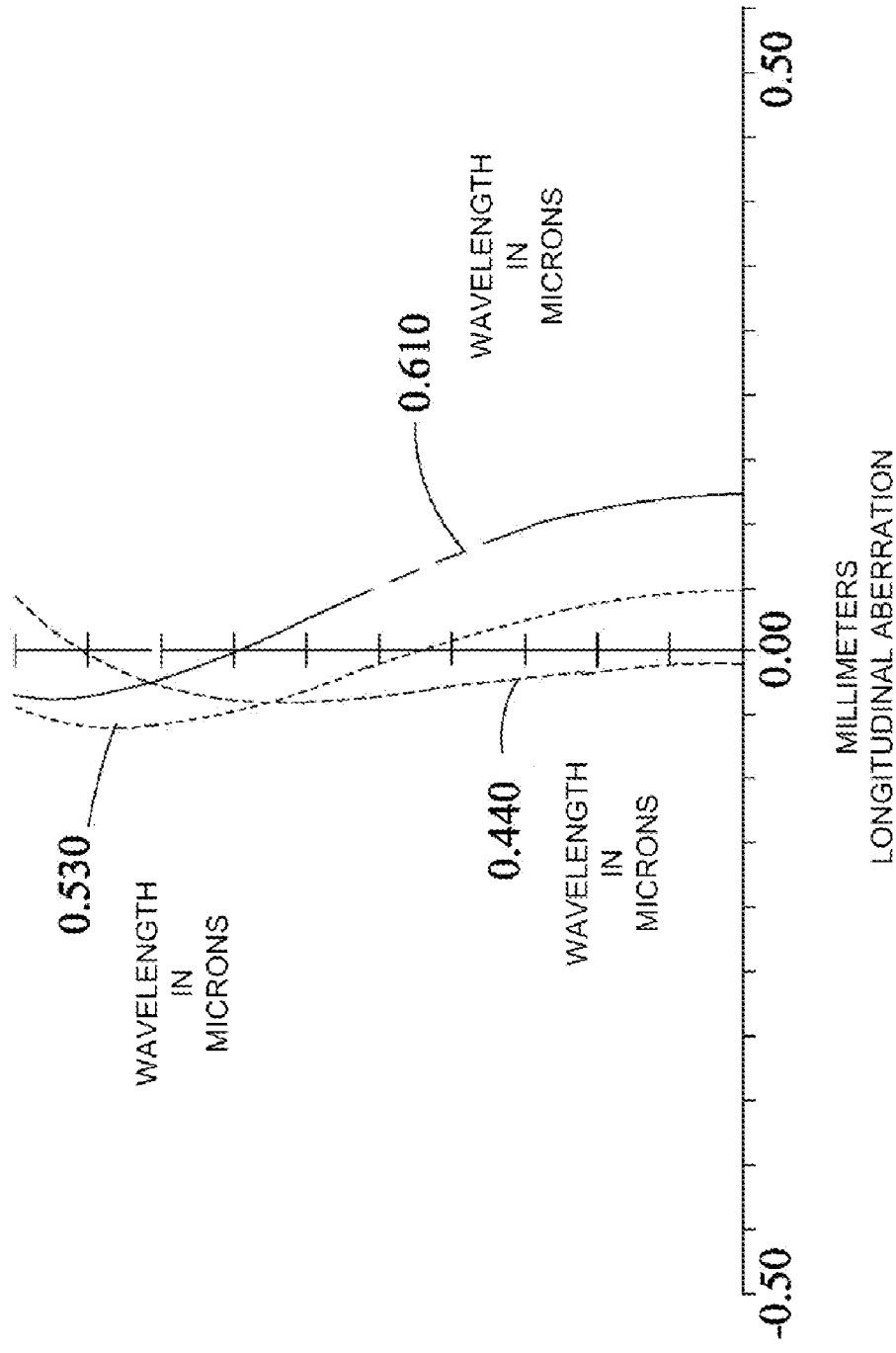
FIG. 2a is a graph of the longitudinal aberration obtained by the first embodiment of the invention Wide angle lens.
Figures 2B, 2C:
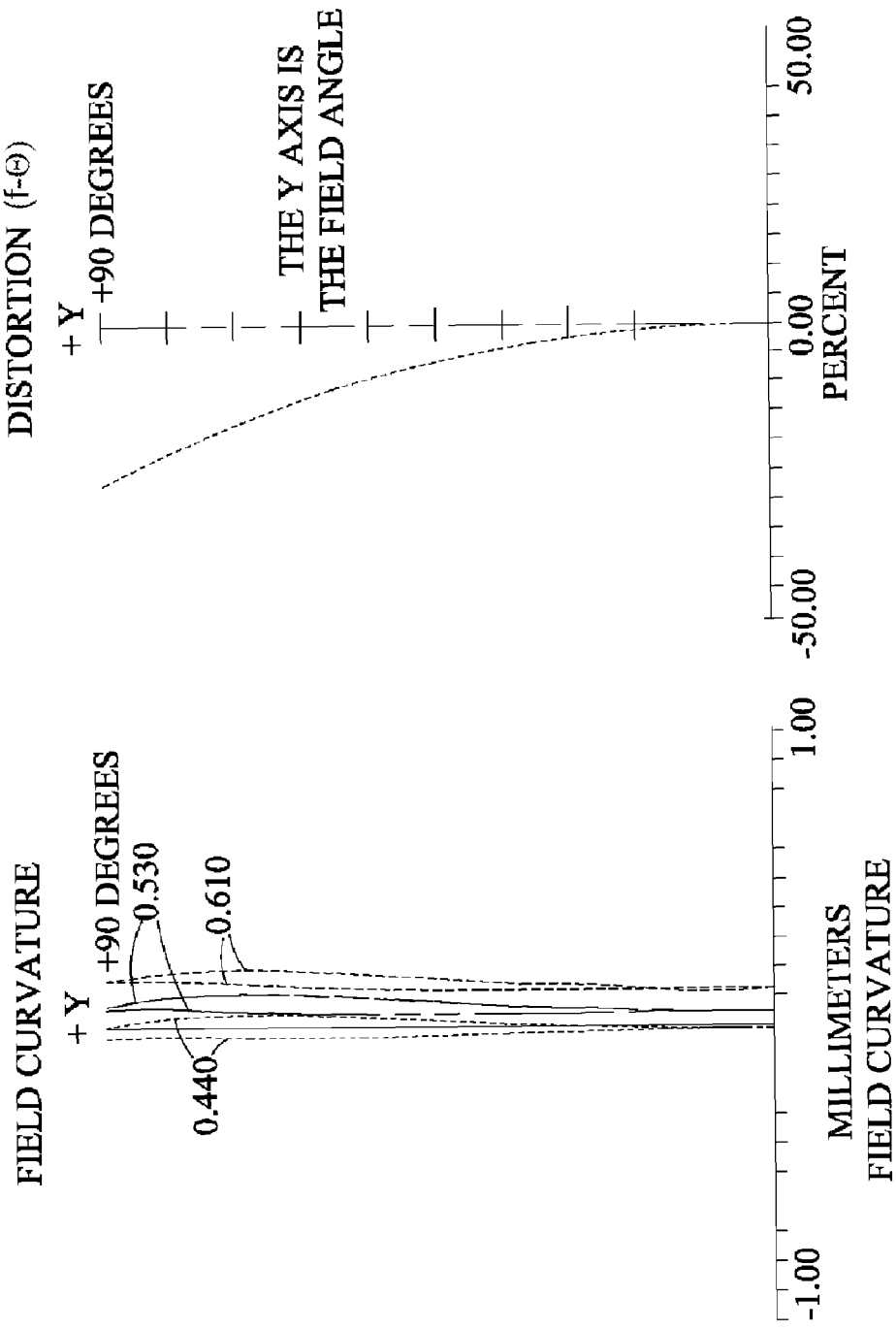
FIG. 2b is a graph of the field curvature obtained by the first embodiment of the invention Wide angle lens.
FIG. 2c is a graph of distortion obtained by the first embodiment of the invention Wide angle lens.

FIG. 2a shows the longitudinal aberration and FIGS. 2b and 2c show the astigmatism/field curvature and f-θ distortion. Excellent optical aberrations correction up to F/5.6 aperture is achieved with this design. FIGS. 2a, 2b and 2c can be generated by using an optical design program such as Zemax® (www.zemax.com) or Code V® available from Optical Research Associates in Pasadena, Calif. The interpretations of FIGS. 2a, 2b and 2c can be found in traditional lens design literature. They represent the departure of the actual lens performance from a perfect imaging lens.

EXAMPLE 2

A second embodiment was discussed in conjunction with FIG. 3 above. This embodiment further includes a third lens element in the second group of the design. Table 2 shows an exemplary detailed prescription for this design. The description is the same as described for Example 1 above, except in this example refer to FIG. 3 for the lens elements.

TABLE 2

Prescription data for a second embodiment
Effective Focal Length: 6.0 mm
Back Focal Length: 38 mm
SURFACE DATA SUMMARY:

| Surf | Type | Radius (mm) | Thickness (mm) | Index (Nd) | Abbe# |
|---|---|---|---|---|---|
| OBJ | STANDARD | Infinity | Infinity | | |
| 1 | STANDARD | 92.5 | 2.00 | 1.665 | 54.69 |
| 2 | STANDARD | 16.2 | 12.2 | | |
| 3 | STANDARD | −63.0 | 2.00 | 1.665 | 54.69 |
| 4 | STANDARD | 28.5 | 15.3 | | |
| 5 | STANDARD | 45.8 | 7.00 | 1.689 | 31.18 |
| 6 | STANDARD | −16.4 | 1.00 | 1.804 | 46.58 |
| 7 | STANDARD | 508.9 | 43.2 | | |
| STO | STANDARD | Infinity | 3.10 | | |
| 9 | STANDARD | 58.4 | 2.75 | 1.533 | 57.99 |
| 10 | STANDARD | −8.74 | 1.00 | 1.910 | 35.47 |
| 11 | STANDARD | −25.3 | 0.0015 | | |
| 12 | STANDARD | −213.6 | 2.50 | 1.501 | 57.40 |
| 13 | STANDARD | −13.7 | 38.0 | | |
| IMA | STANDARD | Infinity | | | |

The embodiment has the following properties:

$|R1i/f|=2.69$; within the range of 2.5 to 3.5 of eq.(1).

N4>N3; of eq.(2)

V4>V3; of eq.(3)

$|R7o|>|R7i|$; of eq.(4)

$|f1/f|=2.51$; within the range of 2 to 3 of eq.(5)

$|f12/f|=2.0$; within the range of 1.5 to 2.5 of eq.(6)

$|f2/f|=4.51$; within the range of 4 to 5 of eq. (7)

$BFL/f=6.33$; within the range of 6 to 7.5 of eq. (8) and (9).

$\Sigma d/f=15.33$; within the range of 10 to 21 of eq. (10)

FIG. 3a shows the longitudinal aberration and FIGS. 3b and 3c show the astigmatism/field curvature and f-θ distortion. Excellent optical aberrations correction up to F/4.6 aperture is achieved with this design. By adding an additional element to the second group, we were able to increase the relative aperture still maintaining acceptable performance. FIGS. 3a, 3b and 3c can be generated by using an optical design program such as Zemax® (www.zemax.com) or Code V® available from Optical Research Associates in Pasadena, Calif.

SUMMARY

A wide angle lens especially suitable for digital single lens reflex cameras is described. The lens offers the advantages of superior performance while using fewer lens elements thus reducing size and cost to manufacture. The lens consists of two lens groups separated by an aperture stop. The first lens group consists of a meniscus lens and the novel use of a bi-concave lens element. The first group may also include a cemented doublet with novel ratios of refractive index and Abbe numbers. Embodiments of the wide angle lens satisfies conditional equations of $6 \leq BFL/f \leq 7.5$ and $10 < \Sigma d/f \leq 21$, where BFL is the distance from the most image side lens element surface to the image plane with the lens focused at infinity, f is the effective focal length of the wide angle lens and Σd is the distance from the most object side lens element surface to the most image side lens element surface.

Those skilled in the art will appreciate that various adaptations and modifications of the preferred embodiments can be configured without departing from the scope and spirit of the invention. Therefore, it is to be understood that the invention may be practiced other than as specifically described herein, within the scope of the appended claims.

What is claimed is:

1. A wide angle lens comprising:
   a) sequentially from object to image of a first lens group and a second lens group,
   b) said first lens group, having a negative refractive power, said first lens group comprising sequentially from object to image of a first, second, third and fourth lens element, where the second lens element is a bi-concave lens element, and
   c) said second lens group, having a positive refractive power, said second lens group comprising sequentially from object to image, of a fifth and sixth lens element; and said wide angle lens having a field of view of about 175 degrees or more.

2. The wide angle lens of claim 1 where the fifth and sixth lens elements form a cemented doublet.

3. The wide angle lens of claim 2 where the second lens group further comprises a positively powered seventh lens element located on the image side of the sixth lens element.

4. The wide angle lens system of claim 3 satisfying the condition:

$|R7o|>|R7i|$ where R7o is the radius of curvature of the object surface of the seventh lens element and R7i is the radius of curvature of the image surface of the seventh lens element.

5. The wide angle lens of claim 3 satisfying the conditions:
   a) $2.5<|R1i/f|<3.5$
      where R1i is the radius of curvature of the image surface of the first lens element and f is the effective focal length of the wide angle lens, and:
   b) $|R7o|>|R7i|$
      where R7o is the radius of curvature of the object side of the seventh lens element and R7i is the radius of curvature of the image side of the seventh lens element.

6. The wide angle lens of claim 3 where the seventh lens element of the second group is aspherical.

7. The wide angle lens of claim 2 where the second lens group further comprises a seventh and eighth element located to the image side of the sixth element where the seventh and eighth elements form a cemented doublet.

8. The wide angle lens of claim 1 where:
   a) the first lens element is a negative power lens, the second lens element is a negative power lens, the third lens element is a positive power lens, the fourth lens element is a negative power lens, the fifth lens element is a positive power lens and the sixth lens element is a negative power lens, and
   b) the third and fourth lens elements form a cemented doublet lens element, and
   c) the fifth and sixth lens elements form a cemented doublet lens element.

9. The wise angle lens of claim 8 satisfying the conditions:
   a) N4>N3, and
   b) V4>V3
      where N4 and V4 are the refractive index and Abbe number respectively of the fourth lens element and N3 and V3 are the refractive index and Abbe number respectively of the third lens element.

10. The wide angle lens of claim 8 satisfying the condition:
a) $2.5<|R1i/f|<3.5$
where $R1i$ is the radius of curvature of the image surface of the first lens element and f is the effective focal length of the wide angle lens, and:
b) $N4>N3$
c) $V4>V3$
where N4 and V4 are the refractive index and Abbe number respectively of the fourth lens element and N3 and V3 are the refractive index and Abbe number respectively of the third lens element.

11. The wide angle lens of claim 1 satisfying the conditions:

$$6<=BFL/f<=7.5$$

where BFL is defined as the distance from the most image side lens element surface vertex to the image plane with the wide angle lens focused at infinity, and where f is defined as the effective focal length of the wide angle lens.

12. The wide angle lens of claim 1 satisfying the conditions:

$$10<\Sigma d/f \leq 21$$

where $\Sigma d$ denotes the distance from the most object side lens element surface vertex to the most image side lens element surface vertex, and where f is defined as the effective focal length of the wide angle lens.

13. The wide angle lens of claim 1 satisfying the conditions:
a) $6<=BFL/f<=7.5$
where BFL is defined as the distance from the most image side lens element surface vertex to the image plane with the wide angle lens focused at infinity, and where f is defined as the effective focal length of the wide angle lens, and
b) $10<\Sigma d/f \leq 21$
where $\Sigma d$ denotes the distance from the most object side lens element surface vertex to the most image side lens element surface vertex, and where f is defined as the effective focal length of the wide angle lens.

14. The wide angle lens of claim 1 satisfying the condition:

$$1.5<|f12/f|<2.5$$

where f12 is the effective focal length of the combined first and second lens elements and f is the effective focal length of the wide angle lens.

15. The wide angle lens of claim 1 satisfying the condition:

$$2<|f1/f|<3$$

where f1 is the focal length of the first lens group and f is the focal length of the wide angle lens.

16. The wide angle lens of claim 1 satisfying the condition:

$$4<|f2/f|<5$$

where f2 is the focal length of the second lens group and f is the focal length of the wide angle lens.

17. The wide angle lens of claim 1 satisfying the conditions:
a) $2<|f1/f|<3$, and
b) $4<|f2/f|<5$
where f1 is the focal length of the first lens group, f2 is the focal length of the second lens group and f is the effective focal length of the wide angle lens.

18. The wide angle lens of claim 1 satisfying the conditions:
a) $2<|f1/f|<3$, and
b) $1.5<|f12/f|<2.5$, and
c) $4<|f2/f|<5$,
where f1 is the focal length of the first lens group, f12 is the effective focal length of the combined first and second lens elements, f2 is the focal length of the second lens group and f is the effective focal length of the wide angle lens.

19. The wide angle lens of claim 1 satisfying the condition:

$$2.5<|R1i/f|<3.5$$

where $R1i$ is the radius of curvature of the image surface of the first lens element and f is the effective focal length of the wide angle lens.

20. The wide angle lens of claim 1 where the first element is aspherical.

21. The wide angle lens of claim 1 where the second element is aspherical.

* * * * *